United States Patent Office 3,470,138
Patented Sept. 30, 1969

3,470,138
POLYMERIC IMINIC-ALUMINIUM COMPOUNDS AS CATALYSTS FOR ALPHA-OLEFIN POLYMERIZATION
Walter Marconi, Sebastiano Cesca, and Arnaldo Roggero, San Donato Milanese, Milan, Italy, assignors to SNAM S.p.A., Milan, Italy, a company of Italy
No Drawing. Filed Oct. 12, 1965, Ser. No. 495,331
Claims priority, application Italy, Feb. 3, 1965, 890
The portion of the term of the patent subsequent to Sept. 16, 1986, has been disclaimed
Int. Cl. C08f 1/34; C07f 5/06; B01j 11/00
U.S. Cl. 260—80.78    4 Claims

ABSTRACT OF THE DISCLOSURE

A catalytic system for the preparation of olefinic, amorphous, unsaturated terpolymers comprising an aluminum compound which is a linear polymer of polyiminic nature containing between 4 and 50 repeating units of the type $$-\left[\begin{array}{c}-Al-N-\\ |\quad\;\; |\\ H\;\;\;R\end{array}\right]-$$

where R is a hydrocarbon radical selected from the group consisting of alkyl, aryl, and cycloalkyl radicals, and a transistion metal compound selected from the group consisting of $TiCl_4$, $TiCl_3$, $VCl_4$, $VO(OC_2H_5)_3$, and $ZrCl_4$, the polymerized olefins being selected from the group consisting of ethylene, propylene, butene-1, pentene-1, 3-methyl-pentene-1, 4-methyl-pentene-1, and homologues.

---

The present invention constitutes an improvement on the inventions disclosed in the copending applications of Walter Marconi et al. Ser. No. 494,874, filed Oct. 11, 1965 and of Walter Marconi et al., Ser. No. 496,154, filed Oct. 14, 1965. Application Ser. No. 494,874 relates to the polymerization of diolefins. Application Ser. No. 496,154 relates to the polymerization of alpha-olefins.

The present invention relates to a new catalytic system for the copolymerization of one or more alpha-monoolefins with other compounds containing at least two double bonds in their molecule.

From another standpoint the present invention relates to a process for the preparation of amorphous vulcanizable olefinic terpolymers using said catalytic systems.

It is known to prepare terpolymers of two or more monoolefins and a polyene in such a way as to obtain products which can be vulcanized according to the conventional techniques used for unsaturated rubbers, using catalytic systems comprising a transition metal compound and an organometallic compound of aluminum.

Said catalytic systems, containing alkyl aluminum compounds, have the disadvantage of instability characteristic of those organometallic compounds which are easily attacked by moisture, oxygen, etc.

On the other hand, it must be considered that these catalytic systems do not always yield terpolymers having the right structure regularity, i.e., many of these catalytic systems used in the copolymerization of alpha-olefins with polyenic compounds do not yield real statistic copolymers but rather chains built up by short homopolymeric sequences of the different monomers. This gives rise to less efficient vulcanization and yields elastomers having lower mechanical properties.

We have now found that it is possible to obtain terpolymers which can yield, by vulcanization, elastomers having very good mechanical characteristics, using catalytic systems consisting of transistion metal derivatives together with linear polymeric compounds of aluminum of polyiminic nature, having in their molecules repeating units of the type:

$$-\left[\begin{array}{c}-Al-N-\\ |\quad\;\; |\\ H\;\;\;R\end{array}\right]-$$

where R represents an aryl, alkyl or cycloalkyl hydrocarbon radical.

Said compounds can be easily prepared by reaction of $LiAlH_4$ with the hydrochlorides of amines, or by reaction of $AlH_3$ with primary amines.

(1)
$$nR-NH_2.HCl + nLiAlH_4 \longrightarrow$$
$$=H-\left[\begin{array}{c}R\\ |\\ Al-N\\ |\\ H\end{array}\right]_{n-1}-Al=N-R + 3nH_2 + nLiCl$$

(2)
$$nAlH_3.NR_3 + nR'NH_2 \longrightarrow$$
$$H\left[\begin{array}{c}R'\\ |\\ Al-N\\ |\\ H\end{array}\right]_{n-1}-Al=N-R' + nNR_3 + 2nH_2$$

where R and R' are the same or different and are selected from aryl, alkyl or cycloalkyl hydrocarbon radicals such as, for example: $CH_3$, $C_2H_5$, $nC_4H_9$, $C_6H_5$ and the like.

Said compounds will be also defined aluminum iminic polymers in the course of this description.

The preparation of said compounds is described by E. Wiberg and A. May in Z. f. Naturforsch, 106, 232 (1955) and more particularly by R. Ehrlich and coll. in Inorg. Chem. 3, 628 (1964). Molecular weight measurements show them to be polymers having $n \geq 4$.

When $n$ is small (from 4 to about 50), said compounds are soluble in aromatic and sometimes aliphatic solvents. Higher molecular weight compounds are insoluble in common solvents although they are still effective as catalysts in the presence, e. g. of $TiCl_4$, since they still contain an equivalent of active hydrogen for each aluminum atom. Said compounds, principally with respect to the alkyl aluminum compounds used in the conventional art, have the advantages of higher stability to oxidizing and hydrolizing agents and of better handling.

The transition metal compounds which can be advantageously used in these catalytic systems are, for example: $TiCl_4$, $TiCl_3$, $VCl_4$, $VO(OC_2H_5)_3$, $ZrCl_4$ and the like.

The reaction temperature must be kept rather low; one can operate at temperatures between $-50$ and $+50°$ C., preferably between $-30$ and $+20°$ C.

Polymerization can be carried out at atmospheric pressure or under pressures of up to 100 atm.

One can operate or not in the presence of aliphatic, aromatic, or cycloaliphatic hydrocarbon solvents, or one or more of the monomers can act as solvents.

Olefinic monomers can be selected from one or more of the following: ethylene, propylene, butene-1, isobutene, pentene-1, 3-methyl-pentene-1, 4-methyl-pentene-1 and homologues up to 12 carbon atoms in the molecule. Particularly, ethylene and propylene are used.

The polyenic compound which imparts the unsaturation to the terpolymer can be selected from non-conjugated diolefins such as 1,4-pentadiene, 1,4-hexadiene, 3-methyl-1,4-pentadiene, and the like, or among cyclic polyenes, such as dicyclopentadiene, vinylcyclohexane, 1,4- and 1,5-cyclooctadiene, tetrahydroindene and its alkylene or alkylidene derivatives, or among cyclic polyvinyl hydrocarbons, such as divinyl-cyclobutane, divinyl-benzene and trivinyl-cyclohexane.

The catalytic system can be achieved by interaction of its components in the presence or not of one of the monomers, or it can be obtained directly during the polymerization by introducing singularly into the reactor the catalytic system components and the monomers.

The following examples illustrate the invention without limiting it.

Example 1

Into a tubular glass reactor fitted with a mechanical agitator, thermometer sheath and a tube for gas addition, 400 cm.³ of n-heptane and 5 cm.³ of dicyclo-pentadiene which are thermostated at the temperature of −20° C., are introduced under inert atmosphere. The hydrocarbon solvent is saturated with a gaseous stream of propylene and ethylene having a molecular ratio 2.4 to 1 thereafter 4.77 mgr. atoms of Al as n-butyliminic polymer and 1.88 mmoles of $VCl_4$ are introduced into the reactor. In 15 minutes polymerization time, after coagulation from excess alcohol and drying at 50° C. and reduced pressure, 15.1 gr. of elastomer, amorphous by X-ray examination, are obtained and having $[\eta]=5.1$ dl./gr. The ethylene content is 50% by mole, while the presence of dicyclopentadiene is proved by the fact that a portion of the produced polymer vulcanized with the following recipe:

| | |
|---|---|
| Terpolymer parts | 100 |
| ZnO do | 5 |
| S do | 2 |
| Stearic acid do | 0.5 |
| Mercaptobenzothiazole do | 1 |
| Tetramethylthiuram disulphide do | 2 |
| Temperaure ° C | 144.5 |
| Time hours | 2 | results cross-linked, as evident from the following measurements:

| | Before vulcanization | After vulcanization |
|---|---|---|
| 300% modulus (kg./cm.²) | 9 | 31 |
| Ultimate tensile stress (kg./cm.²) | 8 | 88 |
| Elongation at break (percent) | 890 | 600 |
| Permanent deformation at break (percent). | 206 | 35 |

Example 2

The same apparatus is used as in Example 1 and the same procedures are followed: 400 cm.³ of n-heptane are saturated at the temperature of −20° C. with a gaseous stream of propylene/ethylene having a molar ratio 2.5 to 1. Successively 5 cm.³ of 4,7,3a,7a-tetrahydro-indene, 10.0 mgr.-atoms of Al present as ethyliminic polymer and 0.42 cm.³ of $VCl_4$ are introduced into the reactor, while the gaseous stream of propylene and ethylene is still flowing. In 10 minutes 12.5 gr. of elastomer, essentially amorphous by X-ray examination, are obtained which show an ethylene content of 42% by mole. The intrinsic viscosity analysis shows $[\eta]=2.61$ dl./gr.

After vulcanization according to the recipe of Example 1, the following measurements are obtained:

| | Before vulcanization | After vulcanization |
|---|---|---|
| 300% modulus (kg./cm.²) | 7 | 23 |
| Ultimate tensile stress (kg./cm.²) | 7 | 60 |
| Elongation at break (percent) | 944 | 633 |
| Permanent deformation at break (percent). | 175 | 46 |

Example 3

The previous run is repeated except that 1,4-pentadiene (4 cm.³) is used as termonomer, which is added during the polymerization time. During 15 minutes, 8.6 gr. are obtained of elastomer essentially amorphous by X-ray examination, which shows $[\eta]=2.71$ dl./gr. and an ethylene content of 57% by mole.

After vulcanization with the same recipe, as in Example 2 the following measurements were obtained:

| | |
|---|---|
| 300% modulus (kg./cm.²) | 26 |
| Ultimate tensile stress (kg./cm.²) | 77 |
| Elongation at break (percent) | 770 |
| Permanent deformation at break (percent) | 75 |

Example 4

The run described under Example 2 is repeated, except that cyclo-octadiene-1,5 (8 cm.³) is used as termonomer. In 7 minutes polymerization time 10 gr. of elastomer are obtained which is essentially amorphous by X-ray examination which shows $[\eta]=3.54$ dl./gr., and an ethylene content of 50% by mole. After vulcanization with the same recipe as in Example 1 the following measurements were obtained:

| | |
|---|---|
| 300% modulus (kg./cm.²) | 11 |
| Ultimate tensile stress (kg./cm.²) | 19 |
| Elongation at break (percent) | 860 |

Example 5

Operating in the same way as described in Example 1, except that 2 cm.³ of 1-ethylidene-(1-ethyl)-4,7,3a,7a-tetrahydroindene are used, 13 gr. of elastomer are obtained in 12 minutes polymerization time, which is essentially amorphous by X-ray examination, and shows $[\eta]=3.90$ dl./gr. and an ethylene content of 48% by mole. After vulcanization with the same recipe as Example 1, the following measurements were obtained:

| | |
|---|---|
| 300% modulus (kg./cm.²) | 14 |
| Ultimate tensile stress (kg./cm.²) | 25 |
| Elongation at break (percent) | 800 |

Example 6

The same procedure is followed as in Example 1 except that 3 cm.³ of 1-ethylidene-(1-phenyl)-4,7,3a,7a-tetrahydroindene are used. In 30 minutes, 5.5 gr. of elastomer are obtained, which is essentially amorphous by X-ray examination, showing $[\eta]=3.85$ dl./gr. and an ethylene content of 60% by mole. After vulcanization with the same recipe as in Example 1 the following measurements were obtained:

| | |
|---|---|
| 300% modulus (kg./cm.²) | 18 |
| Ultimate tonsile stress (kg./cm.²) | 41 |
| Elongation at break (percent) | 779 |

Example 7

The same run as described in Example 1 is repeated, except that 2 cm.³ of 1-isopropylidene-4,7,3a,7a-tetrahydroindene are used. In 30 minutes reaction time 6 gr. of elastomer are obtained which by X-ray examination is essentially amorphous, while ethylene content is 67% by mole. Intrinsic viscosity measurement yields $[\eta]=3.9$ dl./gr. Part of the obtained elastomer is vulcanized according to the recipe of Example 1, obtaining the following measurements:

| | |
|---|---|
| 300% modulus (kg./cm.²) | 29 |
| Ultimate tensile stress (kg./cm.²) | 71 |
| Elongation at break (percent) | 817 |

Example 8

The run described in Example 1 is repeated, except that the vanadium compound used in $VOCl_3$ (5.3 mmoles) and the aluminum compound used is an ethyliminic compound (13.25 mmoles); furthermore 2 cm.³ of 1-ethylidene - (1 - ethyl) - 4,7,3a,7a - tetrahydroindene are charged to the reactor.

In 20 minutes polymerization time 5.2 gr. of elastomer are obtained which by X-ray examination is essentially amorphous. Ethylene content is 71% by mole while intrinsic viscosity measurement yields $[\eta]=3.16$ dl./gr. A part of the elastomer produced is vulcanized with the receipe of Example 1 obtaining the following results:

300% modulus (kg./cm.²) _____ 44
Ultimate tensile stress (kg./cm.²) _____ 79
Elongation at break (percent) _____ 680

Example 9

The same procedure is followed as in Example 1 except that the vanadium compound used in VOCl₃ and the aluminum compound used is an n-butyliminic polymer (13.25 mmoles) and that 4 cm.³ of dicyclopentadiene are charged to the reactor.

In 15 minutes reaction time 5.5 gr. of elastomer are obtained which by X-ray examination is completely amorphous while the measured ethylene content is 61% by mole. [η] measurement yields 3.10 dl./gr. After vulcanization of part of the elastomer produced, with the receipe of Example 1, the following measurements are obtained:

300% modulus (kg./cm.²) _____ 34
Ultimate tensile stress (kg./cm.²) _____ 52
Elongation at break (percent) _____ 670

The embodiments of the invention in which an exclusive property or privilege is claimed are defined as follows:

1. A catalytic system for the preparation of olefinic, amorphous, unsaturate terpolymers comprising an aluminum compound and a transition metal derivative selected from the group consisting of TiCl₄, TiCl₃, VCl₄, VO(OC₂H₅)₃, and ZrCl₄, said aluminum compound being a linear polymer of polyiminic nature containing at least four repeating units of the type

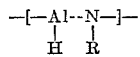

where R is a hydrocarbon radical selected from alkyl, aryl and cycloalkyl radicals.

2. A catalytic system according to claim 1 wherein in the linear polymer of polyiminic nature the repeating units are between 4 and 50.

3. A process for the preparation of olefinic amorphous, vulcanizable terpolymers starting from one or more olefins and a polyene, where the polymerized olefins are selected from one or more of the following: ethylene, propylene, butene-1, pentene-1, 3-methyl-pentene-1, 4-methyl-pentene-1 and homologues having up to 12 carbon atoms in their molecules, the polymerization reaction being carried out in the presence of a catalyst which is the interaction product of a transition metal compound selected from the group consisting of TiCl₄, TiCl₃, VCl₄, VO(OC₂H₅)₃, ZrCl₄ and an aluminum compound consisting of a linear polymer of polyiminic nature having from 4 to 50 repeating units of the type:

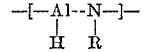

where R is a hydrocarbon radical selected from alkyl, aryl, and cycloalkyl radicals.

4. A process according to claim 3 where the polymerized polyene is selected from the group consisting of 1,4-pentadiene, 1,4-hexadiene, 3-methyl-1,4 - pentadiene, dicyclopentadiene, tetrahydroindene and its alkylenic and alkylidenic derivatives, 1,4- and 1,5-cyclooctadienes, divinyl cyclobutane, divinyl benzene, trivinyl cyclohexane, the polymerization reaction being carried out in the presence of a catalyst which is the interaction product of a transition metal compound selected from the group consisting of TiCl₄, TiCl₃, VCl₄, VO(OC₂H₅)₃, and ZrCl₄, and an aluminum compound consisting of a linear polymer of polyiminic nature having from 4 to 50 repeating units of the type

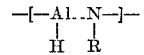

where R is a hydrocarbon radical selected from alkyl, aryl and cycloalkyl radicals.

References Cited

UNITED STATES PATENTS 3,255,169   3/1965   Kearby _____ 260—94.9

JOSEPH L. SCHOFER, Primary Examiner
ROGER S. BENJAMIN, Assistant Examiner

U.S. Cl. X.R.
252—429, 431